US004001690B2

United States Statutory Invention Registration [19]

[11] Reg. Number: H1690

Nye

[45] Published: Nov. 4, 1997

[54] PROCESS FOR BLEACHING KRAFT PULP

[76] Inventor: Jeffrey Nye, 12409 Cederfall Dr., Huntersville, N.C. 28078

[21] Appl. No.: 504,818

[22] Filed: Jul. 20, 1995

[51] Int. Cl.[6] ..... D21C 3/20

[52] U.S. Cl. ..... 162/72

[58] Field of Search ..... 162/76, 78, 80, 162/83, 84

[56] References Cited

U.S. PATENT DOCUMENTS

| | | | |
|---|---|---|---|
| 4,578,149 | 3/1986 | Fagerlund | 162/39 |
| 4,804,440 | 2/1989 | Liebergott et al. | 162/70 |
| 5,211,809 | 5/1993 | Naddeo et al. | 162/6 |

FOREIGN PATENT DOCUMENTS

| | | |
|---|---|---|
| 1154205 | 9/1983 | Canada . |
| 0187477 | 7/1986 | European Pat. Off. . |
| 0514901 | 11/1992 | European Pat. Off. . |
| 0608687 | 8/1994 | European Pat. Off. . |
| 9011403 | 10/1990 | WIPO . |
| 9207139 | 4/1992 | WIPO . |
| 9207994 | 5/1992 | WIPO . |
| 9412721 | 6/1994 | WIPO . |
| 9412722 | 6/1994 | WIPO . |

OTHER PUBLICATIONS

McDonough, T. J., "The Chemistry of Organosolv Delignification", *Tappi Journal*, vol. 76, No. 8: 186(1993).

Liebergott, N. et al., "Bleaching a Softwood Kraft Pulp without Chlorine Compounds", *Tappi Journal*, vol. 67, No. 8: 76 (1984).

Liebergott, N. et al., "Bleaching a Softwood Kraft Pulp without Chlorine Compounds", 1983 Pulping Conference Proceedings, *Tappi Press*, Atlanta, pp. 323–332.

Leduc, C., Gagne, C., Barbe, M., Daneault, C., "Bleaching of Chemimechanical Pulps: A Comparison of Oxidizing and Reducing Multistage Sequences", 1989 Pulping Conference Proceedings, *Tappi Press*, Atlanta, pp. 627–640.

Ducharme, N. et al., "Optimum Conditions for the Bleaching of Totally Chlorine Free Kraft Pulps with a Sodium Hydrosulfite Bleach Solution", 1993 Pulping Conference Proceedings, *Tappi Press*, Atlanta, p. 777.

*Primary Examiner*—Charles T. Jordan
*Assistant Examiner*—Meena Chelliah

[57] ABSTRACT

A method for bleaching lignocellulose containing pulp which has been chemically pulped is described wherein the method comprises the steps of sequentially treating the pulp with a reducing agent, a chelating agent and an oxidative agent.

13 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PROCESS FOR BLEACHING KRAFT PULP

FIELD OF THE INVENTION

This invention relates to a process in which a kraft pulp is first bleached with a reductive bleaching chemical such as sodium hydrosulfite and then is treated with an oxidative bleaching chemical such as hydrogen peroxide. The combination of a reductive followed by an oxidative treatment stage imparts special properties to the pulp that are unavailable with each treatment alone or with the treatments in the reverse order.

BACKGROUND OF THE INVENTION

The pulp and paper industry faces many challenges in the modern world. One of these is to develop new strategies for bleaching pulp that are environmentally benign. The industry has made significant gains in this area especially in the use of chlorine and chlorine containing compounds. It is generally accepted that molecular chlorine can be abandoned in favor of chlorine dioxide, for example. However, chlorine dioxide is not without its own risks and therefore much attention has been paid to alternative chemicals that contain no chlorine. Examples of these include hydrogen peroxide, oxygen, ozone and peracids. Most of these are either in current use or have been demonstrated at the pilot plant level or higher. All of these chemicals act as oxidizing agents. There is another class of chemicals, reducing agents, that have received very little attention compared to the oxidizers.

An example of a reductive bleaching agent is sodium hydrosulfite. Comparatively little work has been done to investigate its use in bleaching chemical pulps.

The use of sodium hydrosulfite to bleach mechanical pulps is widely known. Hydrosulfite in various forms has been used in this application since the 1940's. Combinations of sodium hydrosulfite with other bleaching chemicals are also known. See, for example, U.S. Pat. No. 4,804,440; European case EP 0 187 477 A1; and PCT case WO 90/11403.

In a paper by Barbe, et al, 1989 TAPPI PULPING CONFERENCE PROCEEDINGS, 627–640, the use of hydrosulfite and peroxide in various combinations to bleach mechanical and chemimechanical pulps is discussed. The use of a reducing agent prior to a multi-stage peroxide treatment is described.

Liebergott, et al, TAPPI Journal, 67(8):76–80 (1984) and 1983 TAPPI PULPING CONFERENCE PROCEEDINGS, 323–332, describes the use of sodium hydrosulfite as a final bleaching stage after the use of oxidizers in order to brighten kraft pulps.

In PCT cases WO 94/12721 and WO 94/12722 a process is described for delignifying lignocellulose containing pulp with a peracid followed by a bleaching stage in which a non-chlorine bleaching agent such as sodium dithionite may be used. The conditions for its use are not defined.

In PCT case WO 92/07994 a process is described in which wood is pulped and bleached in the same reactor by displacing the various reactant solutions. This is a variation of U.S. Pat. No. 4,578,149 which focuses on oxidative methods. Hydrosulfite is included in the discussion. However, no details are given as to the particular conditions needed for using it or other reductive agents.

In Canadian patent 1,154,205 a method of treating kraft pulp in conjunction with a first ozone bleaching step is disclosed.

European case EP 0 514 901 A2 (also U.S. Pat. No. 5,211,809 and other references listed therein) describe a process for stripping color from secondary fibers using oxygen in combination with peroxide, ozone and/or hydrosulfite. A final hydrosulfite stage may be used.

European case EP 0 608 687 A1 describes a process for increasing the whiteness of chlorine-free bleached cellulose with an aqueous solution of a reducing agent in the presence of chelating agents.

An article by Ducharme, et al, 1993 TAPPI PULPING CONFERENCE PROCEEDINGS, 777–798 describes the optimum conditions for the use of hydrosulfite as the final bleaching stage for kraft pulps.

PCT case WO 92/07139 describes a three step process for use on kraft pulps in which a reductive bleaching stage is used between two oxidative stages, the first being acidic and the second alkaline.

Owing in part to the extreme variability found in bleaching conditions for pulps there still remains a need for alternative bleaching processes that do not involve chlorine containing chemicals. Thus, it is an object of this invention to provide an efficient process for using a reductive agent to bleach pulp. It is a further object of this invention to provide a process that bleaches pulp with improved bleaching results. It is yet another object of this invention to define the particular conditions of temperature, retention time, and pulp pH under which the overall brightening performance of reductive bleaching chemicals such as sodium hydrosulfite is enhanced. These and other objects of the invention will be apparent from the description of the invention.

SUMMARY OF THE INVENTION

This invention provides a process for bleaching lignocellulose containing pulps with a three step reductive/chelating/oxidative sequence. The reductive stage of the sequence is carried out before the oxidative stage. The oxidative stage can be done in one step or in multiple steps. Selected temperature and pH conditions as well as bleach dosages, bleach additives and chelating agents are also used. The effect of this combination of reductive and oxidative stages is a lignocellulose containing pulp with improved properties that are not available with either stage alone or with the combination of stages in any alternative order.

DETAILED DESCRIPTION OF THE INVENTION

For the purposes of this invention, lignocellulose containing pulps (hereinafter also referred to as "pulp") shall refer to any fibrous material formed from the chemical digestion of wood or any other plant material.

The lignocellulosic material for which this invention is applicable is derived preferably from wood of various species including both hardwood and softwood varieties. The wood must have been chemically pulped by one of many processes including but not limited to the sulfate, sulfite, soda or organosolv processes. Wood processed using the sulfate (also called kraft) process is preferred. Wood treated with the kraft process and of the softwood variety is especially preferred.

The kraft pulp may also be further processed with a step utilizing oxygen gas. The purpose of this step is to reduce the Kappa number of the pulp. The Kappa number is a qualitative measure of the lignin component of the kraft pulp. It is measured by a method such as that given in TAPPI Test Method T 236 om-85, incorporated by reference in its entirety herein. The Kappa number of the pulp used in this process should be in the range of from 5 to 100. Preferably the pulp used in the process of this invention should be treated once with an oxygen delignification stage so as to have a Kappa number in the range 5 to 20.

Kraft pulps treated with this oxygen step are usually also additionally treated with chemicals such as chlorine, chlorine dioxide, hydrogen peroxide and sodium hydroxide in one or more subsequent stages to bleach the pulp. The bleaching process has the objective of removing all or most of the residual lignin and removing the color of the pulp.

In the process of this invention, the kraft pulp is first treated with a reducing agent. The reducing agent is selected from the group consisting of salts of the hydrosulfite ion (including the sodium or zinc salts), sodium borohydride, sodium formaldehyde bisulfite, sodium glyoxal bisulfite, formamidine sulfinic acid, sulfur dioxide, and sodium bisulfite. Preferably sodium hydrosulfite is used.

The pulp is adjusted to a consistency from about 1 to about 20 percent. Pulp consistency is defined as the amount (oven dried weight) of solid material, mainly pulp, in a given mixture of solids and water. While the pulp consistency may range from 1 to 20 percent based on the solid material, the preferred range is from 3 to 15 percent and the more preferred range is from 3 to 5 percent.

If not already at the preferred temperature, the pulp mixture is then heated to a temperature in the range of about 40° C. to 100° C., but preferably in the range of 65° C. to 90° C. Heating is critical to the process. The pulp should be at the desired temperature before the reducing agent is added. In a continuous pulp production process, steam may be added to the pulp stream between stages to bring the pulp to temperature.

Next, the pH of the pulp is adjusted before the addition of the reducing agent. The adjustment of the pH of the pulp prior to the addition of the reducing agent is critical and may range from 4.5 to 10.0, with a preferred range being 6.0 to 7.5.

Then the reducing agent is added; and the mixture is maintained at temperature for a selected period of time. The dosage of the reducing agent added, for example, sodium hydrosulfite, is based on the weight of the solid material present in the solids/water mixture. Therefore a dosage quoted as 1 percent is 1 gram of solid sodium hydrosulfite per 100 grams of oven dried pulp. The reducing agent, for example sodium hydrosulfite, may be added in an amount of about 0.1 to 3 percent based on the oven dried weight of the pulp, preferably in an amount of from 0.5 to 2.0 percent, and most preferably in an amount o between 1 and 2 percent. As will be appreciated by those skilled in the art, the addition of a reducing agent such as sodium hydrosulfite should preferably be done in an atmosphere that is substantially free of oxygen. A suitable addition point of the reducing agent is, for example, the suction side of a pump that carries the pulp through the process. Suitable types of sodium hydrosulfite which may be used include blends of sodium hydrosulfite sold commercially under the trademarks VBRITE® and VIRWITE® from Hoechst Celanese Corporation, Somerville, N.J.

The retention time for the treatment with the reducing agent is somewhat dependent on the temperature chosen; thus, the slight decrease in performance at lower temperatures can be made up by retaining the kraft pulp for longer time periods. The retention time can vary between 10 and 360 minutes. With a temperature at the low end of the preferred range, such as 65° C., the preferred retention time range is 120–180 minutes. At 90° C. the time is shortened to 60–120 minutes.

Next the pulp is washed. It is important that the pulp be thoroughly washed between chemical treatment stages. The purpose of the washing step is to remove undesirable chemical components such as dissolved lignin or other organic material. Such contaminating material can consume and/or interfere with chemicals added in subsequent treatment stages, or can re-deposit onto the pulp fibers and become difficult to remove in subsequent treatment stages.

Washing refers to a process where the liquid phase of the pulp/water suspension is displaced by means of suction or pressing. The washing liquid may be fresh water or water provided by some other step in the pulp treatment process as long as it does not contain materials that will be deleterious to the subsequent treatment stage. The process usually proceeds by adding water to the pulp/water suspension with good mixing followed by a reduction of the amount of water now in the pulp/water suspension by filtering or pressing through a screening device. The water thus removed is either sent to waste or is re-used in a suitable location in the pulp treatment process. The thickened pulp is sent on to a subsequent treatment stage.

Following the reductive treatment stage and the washing step thereafter, the pulp is then subjected to a chelating treatment to remove unwanted metal ions which will interfere with the acceptable performance of any oxidative bleaching chemical. The treatment must be specifically designed to remove unwanted metal ions such as manganese but leave intact desirable metal ions such as magnesium and calcium. For this purpose a chelating agent is used which is selected from the group consisting of nitrogenous polycarboxylic acids, nitrogenous polyphosphonic acids or nitrogenous polyalcohols. Examples of nitrogenous polycarboxylic acids include diethylenetriamine pentacetic acid (DTPA), ethylenediaminetetraacetic acid (EDTA) or nitrilotriacetic acid (NTA). Preferably DTPA or EDTA are used. Examples of nitrogenous polyphosphonic acids include diethylenetriaminepentamethylphosphonic acid (DTPMA). Other such compounds such as are known to those skilled in the art may be used without departing significantly from the spirit and scope of the invention.

The conditions under which the chelating treatment is conducted will greatly affect the efficiency of the metal ion removal and therefore the performance of subsequent oxidative treatment stages. After the washing step the pH of the pulp is adjusted to be in the range of 2.5 to 11.0, but preferably in the range of 4.5 to 9.0 as noted below. The amount of chelating chemical added should be in the range of 0.01 to 1.0 percent based on the oven dried weight of the pulp with a preferred range being 0.1 to 0.5 percent. The temperature during treatment may range from 20° C. to 100° C. but is preferably selected to be between 55° C. and 90° C. While the pH of the pulp can range from 2.5 to 11.0, the pH range must be tailored to accomplish the type and level of metal ion removal desired. For example, to remove most of the manganese but leave most of the magnesium and calcium the preferred range is 4.5 to 9.0. A suitable retention time for this step is 15 to 60 minutes.

Following the chelation stage there must be an efficient washing stage that will remove the metal ions thus bound so that they will not interfere with subsequent bleaching stages which will be oxidative in nature. This can be accomplished by techniques known to those skilled in the art and which have been previously described.

The third chemical treatment stage utilizes a chemical that reacts through an oxidative mechanism. Oxidative chemicals useful in the practice of this invention include those selected from the group consisting of (a) inorganic peroxides such as hydrogen peroxide and sodium peroxide; (b) organic peracids and salts thereof selected from the group consisting of $C_1$–$C_3$ aliphatic peracids such as peracetic and performic acid, and $C_1$–$C_3$ aromatic peracids; (c) inorganic peracids and salts thereof selected from the group consisting of peroxycarbonates, perborates and persulfates such as peroxymonosulfuric acid (Caro's acid); and (d) chlorine containing compounds such as chlorine, chlorine dioxide, sodium hypochlorite and hypochlorous acid. For salts the cations are preferably sodium and potassium, especially sodium. The preferred peracids are peracetic acid and peroxomonosulfuric acid or salts thereof. Preferably the peroxide will be hydrogen peroxide. Combinations of the above chemicals may also be used such as oxygen with hydrogen peroxide.

For certain of the oxidizing agents described above, the pH of the pulp should be adjusted as will be appreciated by those skilled in the art.

For example, if hydrogen peroxide is selected as the oxidizing agent, then the following conditions should be used. The pH of the reaction should be in the range of 7–13 and, most preferably, be between 9.5 and 11.5. The temperature of the reaction should be between 40° C. and 100° C., but preferably between 75° C. and 90° C. The pulp should be retained at this temperature for from 20 to 360 minutes, but preferably from 90 to 120 minutes. The consistency of the reaction mixture should be between 1 and 50 percent based on the oven dried weight of the pulp in the pulp/water suspension, but preferably between 10 and 20 percent. The amount of hydrogen peroxide present should be between 0.1 and 5 percent based on the oven dried weight of the pulp, but preferably between 1 and 3 percent. An additional amount of chelating material such as those described in the paragraphs above may also be added at the same time as the hydrogen peroxide. The amount of this addition may be between 0.01 and 1 percent based on the oven dried weight of the pulp, but preferably is selected to be between 0.1 and 0.5 percent. An amount of a protective metal cation may also be added especially if the preceding chelating step was not effective. Examples of the protective cationic metals include calcium but preferably magnesium. The amount of magnesium ion to be added is preferably in the range of 0.01 and 0.1 percent. A common source of magnesium ion is common Epsom salts or magnesium sulfate.

In order for the peroxides (such as hydrogen peroxide) to be made chemically active there must also be a source of alkali added. The alkali may be chosen from a group consisting of the alkali metal hydroxides and carbonates, for example, sodium or potassium hydroxide. A mixture of one or more of the hydroxides and/or carbonates may also be used. The amount of alkali metal hydroxide to be added to the hydrogen peroxide bleaching stage will depend greatly on the amount of hydrogen peroxide used as well as the pH of the pulp entering the stage and therefore should be carefully optimized for each situation. For example, alkali can be used in an amount of between 0.05 and 4 percent based on the oven dried weight of the pulp, but is preferably selected to be between 0.5 and 3.5 percent (if one uses the amounts of peroxide described herein).

The final treatment stage must be a neutralization stage in which the remaining unreacted oxidizing chemical(s) is reacted to remove it from the final pulp product. For hydrogen peroxide this neutralizing chemical may be chosen from the group consisting of sulfur dioxide, sodium sulfite, sodium bisulfite or sodium hydrosulfite or the alternative salts of any of these chemicals. The specific conditions and techniques for this step are not critical and are generally known to those skilled in the art. The criteria for success in this step will be the removal of the majority of the residual oxidizing chemical(s) as determined by an appropriate chemical test, for example, the standard thiosulfate titration of iodine.

After the completion of treating the pulp with the process of the invention, the resultant pulp may be optionally treated with additional bleaching stages, used directly for the production of paper products, or thickened so that it is more economical to ship it to a location where the pulp may be used in production of paper products.

The invention and its advantages over conventional treatment strategies will be illustrated in more detail by the examples given below. In these examples the pulp brightnesses are those measured on sample sheets formed according to TAPPI Standard Method T 205 om-88 which is incorporated in its entirety by reference herein. Brightnesses were measured according to TAPPI Standard Method T 525 om-92 which is incorporated in its entirety by reference herein. The machine used to measure the diffuse brightnesses was manufactured by Technidyne Corporation and was a Technibrite Micro TB-1C model.

EXAMPLES

The following examples are illustrative of the invention but should not be construed as limitations thereon. Note that commonly recognized symbols will be used to represent the various bleaching stages. These are: Y for a sodium hydrosulfite stage, Q for the chelation and P for the hydrogen peroxide stage. For example, in Example 1 the sequences YQP and QPY will be compared.

EXAMPLE 1

QPY Sequence

The purpose of Examples 1 and 1A is to show the advantage in utilizing a sodium hydrosulfite treatment as the first stage of a three stage bleaching sequence in which the other two stages are a chelation and a hydrogen peroxide bleach.

A softwood kraft pulp from a western North American mill that had been oxygen delignified to a Kappa number of 8.6 was used. The initial brightness of the pulp was 36.8 percent ISO.

Q Step

For the chelation stage, a portion of pulp (approximately 60 grams (oven-dried weight)) was taken and adjusted to 10 percent consistency with deionized water. The pulp was placed in a plastic beaker and heated in a microwave oven to 90° C. The pulp was then quickly transferred to a Hobart mixer and, while mixing on low speed, the pH of the heated pulp was adjusted to 6.0 with dilute sulfuric acid. Once a pH of 6.0 was obtained, an amount of diethylenetriaminepentaacetic acid (DTPA) was added equal to 0.5 percent based on the oven dried weight of the pulp used. The DTPA was a commercially available product called Versenex™ 80 produced by the Dow Chemical Company. After mixing the chelating agent into the pulp for 2 minutes, the pulp was quickly transferred to a polyethylene plastic bag, sealed and placed in a hot water. bath set at 90° C. The entire process of pH adjustment and chelating agent addition took no more than 5 minutes and the temperature of the pulp did not drop significantly. The pulp was allowed to sit in the hot water bath for 60 minutes. After the 60 minute retention, the pulp was removed from the plastic bag, placed in a 4 liter plastic beaker and diluted to 2.5 percent consistency with deionized water. This is a washing stage. The diluted pulp was mixed with a propeller type mixer for 2 minutes then filtered over a 170 mesh screen with vacuum. The filtered pulp was removed from the screen placed back into the 4 liter plastic beaker, re-diluted to 2.5 percent consistency, mixed again for 2 minutes and finally filtered over the 170 mesh screen with vacuum. The final. consistency of the filtered pulp was in the range 20 to 25 percent. A portion of this pulp was taken for brightness measurement.

P Step

Next the pulp was bleached with hydrogen peroxide. The pulp at 20 to 25 percent consistency was adjusted to 12.5 percent consistency by adding deionized water. This pulp was placed in a plastic bag, then placed in a second plastic bag and placed in a hot water bath for 60 minutes. After the 60 minutes retention time the pulp temperature was 90° C. The pulp was quickly transferred to a Hobart mixer and mixing was started at low speed. A solution of sodium hydroxide, magnesium sulfate and hydrogen peroxide was made so that once the volume of this solution was added to the pulp the pulp consistency would be 10 percent. The amount of each chemical added was: sodium hydroxide 1.5 percent, magnesium sulfate 0.1 percent and hydrogen peroxide 2.5 percent, where all percentages are based on the oven dried weight of the pulp. The hydrogen peroxide, sodium hydroxide and magnesium sulfate were reagent grade chemicals such as are commonly available from chemical supply houses. The hydrogen peroxide was obtained as a 50 percent weight by weight solution. The solution of bleaching chemicals was added to the pulp as it was being mixed and mixing was continued for 2 minutes. The pulp was then quickly transferred to a plastic bag and then into a second plastic bag which was sealed. The pulp was placed into a hot water bath set at 90° C. The pulp was retained in the water bath for 120 minutes. Periodically during the retention the pulp was removed and kneaded for a short time. At the end of the 120 minutes, the pulp was removed from the plastic bags and washed as described in the previous paragraph. At the end of the second washing the pulp was tested for residual hydrogen peroxide by testing the filtered water with peroxide sensitive indicator strips (J.T. Baker Inc. catalogue number 4416-01). No residual peroxide was found with a detection limit of 1 ppm. A sample of this washed pulp was taken for brightness measurement.

Y Step

The pulp was bleached with sodium hydrosulfite (VBRITE®, 6000 a blend containing sodium hydrosulfite, available from Hoechst Celanese Corporation). The pulp was taken from the peroxide washing stage and diluted in polycarbonate plastic bottles to 3.5 percent consistency. Deionized water was used for dilution. The bottles were capped and placed in a hot water bath set at 90° C. for 60 minutes. The bottles were placed in the water bath at staggered times to facilitate equal exposure to the hot water bath. After 60 minutes a bottle was removed from the water bath and by alternately subjecting the bottle and its contents to vacuum and nitrogen gas, the air was purged from the pulp. Following this the bottle was placed on an apparatus that enabled a propeller type mixing blade and a pH probe to be placed inside the bottle. The bottle was capped and a stream of nitrogen was introduced. Mixing was begun and after a short period dilute sulfuric acid or sodium hydroxide was added to adjust the pulp pH to 6.5. Immediately following this step, 2 percent of sodium hydrosulfite based on the oven dried weight of the pulp was added. The sodium hydrosulfite was in the form of a 2 percent by weight solution in deionized water. After the sodium hydrosulfite was added the pulp was mixed for an additional minute then removed from the mixing apparatus and tightly capped. The capped bottle was placed in the hot water bath at 90° C. for 120 minutes. After the 120 minutes retention time the pulp was removed from the bottle and washed as described previously. A sample of this pulp was taken for brightness measurement.

Using the techniques described above, the pulp bleached in the sequence QPY was made into standard TAPPI handsheets and the brightness was measured as 62.8 percent ISO.

EXAMPLE 1A

YQP Sequence

The procedure described in Example 1 was repeated except that the order of the steps was changed to YQP; that is, the sodium hydrosulfite treatment was carried out first instead of last.

Thus, a sample of softwood kraft pulp (approximately 60 grams (oven-dried weight)) from a Western North American mill that had been oxygen delignified to a Kappa number of 8.6 was diluted to a consistency of 3.5 percent. The procedure described in Example 1 under Y Step was repeated. Next, a portion of pulp from the Y step procedure was taken and adjusted to a consistency of 10 percent with deionized water. The procedure described in Example 1 under the Q Step was repeated. Next, the pulp was adjusted to a consistency of 12.5 percent by adding deionized water and the procedure described in Example 1 under the P Step was repeated.

The resultant pulp from this sequence had a brightness of 67.3 percent ISO which is a 4.5 point improvement when sodium hydrosulfite treatment was the initial treatment.

EXAMPLE 2

YP Sequence

The necessity for the chelation stage was shown in this example where the chelation stage was omitted. Here the sequence YP (sodium hydrosulfite followed by hydrogen peroxide) was accomplished by repeating the procedure of Example 1A, but omitting the Q Step.

For the YP sequence a pulp brightness of only 58.9 percent was obtained. This is 6.4 points lower than the corresponding YQP sequence and even lower than the reverse QPY sequence. Thus, the chelation stage before the oxidative bleaching stage is necessary.

EXAMPLE 3

QPY Sequence

For this example a softwood kraft pulp from an eastern North American mill was used. This pulp was also oxygen delignified and had an initial Kappa number of 14.8 and a brightness of 31.2 percent ISO. The pulp was treated with the QPY sequence using the method as described above in Example 1. The brightness of the handsheet was measured using the TAPPI method described above. The brightness was 61.0 percent ISO.

EXAMPLE 3A

The procedure described for Example 1A was repeated except that the pulp used was the type described in Example 3. The brightness was 67.0 percent ISO, 6 points higher than the pulp described in Example 3.

EXAMPLES 4 AND 4A

QPY Sequence and YQP Sequence

A hardwood kraft pulp sample from an eastern North American mill that had been oxygen delignified was used. This pulp had an initial Kappa number of 9.4 and an initial brightness of 37.1 percent ISO. The processes described in Examples 1 and 1A were repeated and handsheets were made using the methods described above. Brightness was measured using the methods described above. The brightness values were 62.8 percent ISO for the sequence QPY and 70.5 percent ISO for the preferred sequence YQP—a difference of 7.7 points.

EXAMPLES 5 AND 5A

The pulp of Examples 4 and 4A was bleached again but with different conditions for the Q and P stages in an attempt to improve the response obtained from these stages.

EXAMPLE 5

The method of Example 1 was followed substantially the same except that the pulp was diluted to 2% consistency, the pH was adjusted to 5.0, the temperature of the reaction was 50 degrees C., and the chelating agent used was ethylenediaminetetraacetic acid (EDTA) at a dosage of 0.6% based on the oven dried weight of the pulp. The interstage washing step was the same. The P stage was changed such that 0.05% magnesium sulfate was used and 0.2% of DTPA based on the oven dried weight of the pulp was added to the hydrogen peroxide bleaching solution. The temperature of the P stage remained at 90 degrees C. but the retention time was extended to 240 minutes.

Using these changed conditions and following with a Y stage treatment as described in Example 1, the final pulp brightness obtained was 77.2% ISO. This brightness is 14.4 points higher than the pulp made in Example 4, indicating that the process changes resulted in a brighter pulp.

EXAMPLE 5A

The method of Example 1A was followed with the changes described above for Example 5. The final brightness obtained from using this sequence of bleaching steps was 79.6% ISO which is 2.4 points higher than the results achieved in Example 5. Thus, even when the Q and P stage process conditions are improved, there is still an advantage in using the YQP sequence as compared to the QPY sequence of bleaching steps.

The following Table I summarizes the data in the above examples. All brightness units are percent ISO.

TABLE I

| Example Number | Description of Pulp in Examples | Brightness from QPY Sequence | Brightness from YQP Sequence | Difference |
|---|---|---|---|---|
| 1 | softwood kraft pulp from western mill, Kappa number 8.6, initial brightness 36.8% ISO | 62.8 | 67.3 | 4.5 |
| 3 | softwood kraft pulp from eastern mill, Kappa number 14.8, initial brightness 31.2% ISO | 61.0 | 67.0 | 6.0 |
| 4 | hardwood kraft pulp from eastern mill, Kappa number 9.4, initial brightness 37.1% ISO | 62.8 | 70.5 | 7.7 |
| 5 | softwood kraft pulp from western mill, Kappa number 8.6, initial brightness 36.8% ISO (same pulp as Example 1) | 77.2 | 79.7 | 2.5 |

I claim:

1. A method for bleaching lignocellulose containing pulp which has been chemically pulped wherein said method comprises the steps of sequentially treating the pulp with a reducing agent, a chelating agent and an oxidative agent.

2. A method as claimed in claim 1 which comprises:

(a) adjusting the consistency of the pulp to be from 1–20 percent;

(b) heating the pulp to be at a temperature in the range of 40 degrees C.–100 degrees C.;

(c) adjusting the pH of the pulp to be in the range of from 4.5–10.0;

(d) adding a reducing agent in an amount of from about 0.1–3 percent based on the oven dried weight of the pulp for a retention time of from 10–360 minutes;

(e) washing said pulp;

(f) adjusting the pH of the pulp to be in the range of 2.5–11;

(g) treating said pulp with a chelating chemical in an amount of from 0.01–1.0 percent by weight based on the oven dried weight of the pulp while maintaining the pulp at a temperature of from 20 degrees–100 degrees C.;

(h) washing said pulp;

(i) treating said pulp with an oxidative chemical; and (j) neutralizing said pulp to remove excess oxidative chemical.

3. A method as claimed in claim 1 or 2 wherein the reducing agent is selected from the group consisting of sodium hydrosulfite, zinc hydrosulfite, sodium borohydride, sodium formaldehyde bisulfite, sodium glyoxal bisulfite, formamidine sulfinic acid, sulfur dioxide and sodium bisulfite.

4. A method as claimed in claim 1 or 2 wherein said reducing agent is sodium hydrosulfite.

5. A method as claimed in claim 1 or 2 wherein the pH of the pulp for the treating with the chelating chemical is adjusted to be in the range of 4.5 to 9.0.

6. A method as claimed in claim 5 wherein said chelating chemical is selected from the group consisting of nitrogenous polycarboxylic acids, nitrogenous polyphosphonic acids and nitrogenous polyalcohols.

7. A method as claimed in claim 6 wherein said chelating chemical is selected from the group consisting of ethylenediaminetetraacetic acid, diethylenetriaminepentaacetic acid and diethylenetriaminepentamethylphosphonic acid.

8. A method as claimed in claim 2 where in step (i) said oxidative chemical is selected from the group consisting of:

(a) inorganic peroxides;

(b) organic peracids and salts thereof selected from the group consisting of $C_1$–$C_3$ aliphatic peracids and $C_1$–$C_3$ aromatic peracids;

(c) inorganic peracids and salts thereof selected from the group consisting of peroxycarbonates, perborates and persulfates, wherein the salts are formed with a cation selected from the group consisting of sodium and potassium; and (d) chlorine containing compounds selected from the group consisting of chlorine, chlorine dioxide, sodium hypochlorite and hypochlorous acid.

9. A method as claimed in claim 8 wherein the inorganic peroxide is selected from the group consisting of hydrogen peroxide and sodium peroxide.

10. A method as claimed in claim 8 wherein the organic acid is selected from the group consisting of peracetic and performic acids.

11. A method as claimed in claim 8 wherein the inorganic peracid is peroxymonosulfuric acid.

12. A method as claimed in claim 9 further comprising the step of adding at the oxidative step from 0.05–4 percent based on the oven dried weight of the pulp of an alkali selected from the group comprising sodium hydroxide, potassium hydroxide, sodium carbonate and potassium carbonate.

13. A method as claimed in claim 12 for using hydrogen peroxide as the oxidative stage wherein:

(a) the pulp consistency in step (i) is from 10 to 20;

(b) the pulp temperature in step (i) is from 75 to 90 degrees C.;

(c) the oxidative chemical is hydrogen peroxide in an amount of 0.1 to 5.0 percent based on the oven dried weight of the pulp and includes the addition of sodium hydroxide in an amount of 0.5 to 3.5 percent by weight based on the oven dried weight of the pulp to yield a pulp pH in the range of 9.5 to 11.5; and (d) magnesium ion is added at a dosage of 0.01 to 1 percent by weight based on the oven dried weight of the pulp for a retention time of 90–120 minutes.

* * * * *